United States Patent [19]

Entrekin

[11] 3,727,189

[45] Apr. 10, 1973

[54] INTERFACE SYSTEM HAVING PHOTO RESPONSIVE MATRIX

[75] Inventor: David A. Entrekin, Fenton, Mich.

[73] Assignee: Cutler-Hammer, Inc., Milwaukee, Wis.

[22] Filed: Aug. 26, 1971

[21] Appl. No.: 175,385

Related U.S. Application Data

[63] Continuation of Ser. No. 777,861, Nov. 21, 1968, abandoned.

[52] U.S. Cl. ............................340/166 R, 340/378 R

[51] Int. Cl. ................................................H04n 3/14

[58] Field of Search .......................340/166; 250/324, 250/199

[56] References Cited

UNITED STATES PATENTS

| | | | |
|---|---|---|---|
| 3,385,970 | 5/1968 | Coffin, Jr. | 250/199 |
| 2,843,845 | 7/1958 | Vozza | 340/324 X |
| 3,078,373 | 2/1963 | Wittenberg | 340/166 EL |
| 2,920,232 | 1/1960 | Evans | 340/166 EL |
| 3,091,876 | 6/1963 | Cole | 340/166 EL |
| 3,122,734 | 2/1964 | Rice | 340/166 UX |
| 3,502,802 | 3/1970 | Osborn | 340/166 X |

*Primary Examiner*—Harold I. Pitts
*Attorney*—Harness, Dickey & Pierce

[57] ABSTRACT

An interface assembly, system and method for inputting information from a source to a data processor, for example, a computer, which includes a means for translating electrical information into a non-electrical signal and retranslating the non-electrical signal back to an electrical signal to eliminate noise. The interface system also has a capability of being readily checked to facilitate locating troubles in the system.

2 Claims, 3 Drawing Figures

INVENTOR.
David A. Entrekin
BY
Harness, Dickey & Pierce
ATTORNEYS

INTERFACE SYSTEM HAVING PHOTO RESPONSIVE MATRIX

CROSS REFERENCES TO RELATED APPLICATIONS

This application is a continuation of Ser. No. 777 861, filed Nov. 21, 1968 and now abandoned.

BACKGROUND AND SUMMARY OF THE INVENTION

In data controlled processing systems, the data processor, a highly responsive system, is extremely sensitive to noise signals. Noise signals are typically generated from the environment surrounding the equipment, from the information source or from the devices utilized in the transmission of data between the information source and the data processor. Accordingly, it is imperative to the effective use of the data processor that any extraneous noise be substantially eliminated from entering the system.

It has been found that extraneous noise may be effectively eliminated by translating the information signal from an electrical signal to an airborne signal and back again, the airborne signal being incapable of supporting any substantial amount of noise signal. Further, by placing the airborne signal in a grounded conductive tunnel-like structure, any high frequency noise is effectively grounded and environmental airborne noise, light or sound, is precluded from modulating the information signal with respect to the receiving device.

Further, in data processors of this type, it is desirable that each subsystem, subdevice or auxiliary equipment be capable of being easily checked or have a self-checking capability to detect faults in the equipment.

In accordance with the features of the present invention, an interface device and system has been devised which is capable of substantially reducing input or environmentally generated noise before entry of the noise into the data processor. This noise reduction is accomplished by a device which is capable of translating the electrical signal into another transmission media, and back again, this translation preferably taking the form of an electrical to airborne signal translation. Also, the mechanical configuration of the interface assembly is devised to be effective to remove electrical noise from the input conductors and also to mask externally generated environmental non-electrical signals from the information conducting portion of the interface assembly.

Accordingly, it is one object of the present invention to provide an interface assembly for a data processing system.

It is another object of the present invention to provide an improved interface system for substantially reducing electrical and non-electrical noise from the information signal prior to entry of the information into the data processing system.

It is a still further object of the present invention to provide an improved interface system which has extremely high speed switching capabilities and is capable of operating on an AC or DC basis.

It is still a further object of the present invention to provide an improved interface assembly and system which has a self-checking capability to discover internal failures of the interface assembly.

It is still a further object of the present invention to provide an improved interface system which has a capability of generating a visible or audible signal in response to information being fed through the interface system.

It is still another object of the present invention to provide an improved method of inputting information from an information source to a data processing system.

It is still a further object of the present invention to provide an improved self-checking method for discovering failures in an interface system and assembly.

It is still another object of the present invention to provide an improved interface method, assembly and system which is reliable in operation, simple to manufacture, and easily maintained.

Further objects, features and advantages of this invention will become apparent from a consideration of the following description, the appended claims and the accompanying drawing in which:

Figure 1:
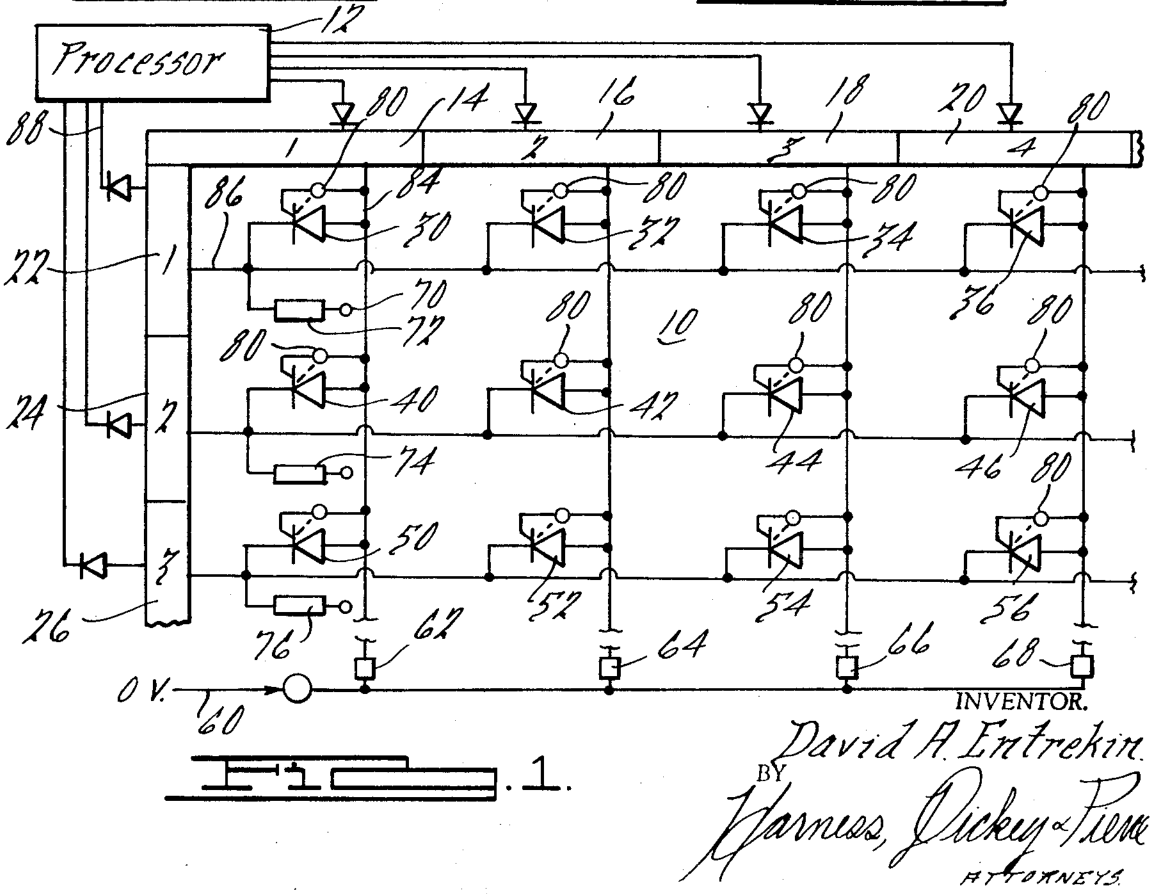
FIG. 1 is a schematic diagram illustrating a preferred form of interface system incorporating features of the present invention.

Referring now to FIG. 1, there is illustrated a schematic diagram of an interface circuit 10 which is adapted to input information from an external source, as for example, an automatic machine processing line (not shown), to a data processing system illustrated as block 12. The interface circuit 10 is connected in the form of a matrix having a plurality of output bit busses 14, 16, 18, 20 etc. corresponding to the "X" coordinate output bits 1, 2, 3, 4 etc. respectively, and a plurality of input busses 22, 24, 26, etc. corresponding to the "Y" coordinate input bits 1, 2, 3, etc. respectively. It is to be understood that the above combination of output and input busses is selected purely for illustrative purposes and any combination of numbers of input and output busses may be utilized to meet the requirements of the particular information source being used.

The input bit 1 bus 22 is interconnected with respective output bit busses 14, 16, 18, 20 by means of a plurality of controlled rectifier devices 30, 32, 34, 36, respectively, and the input bit 2 bus 24 is similarly connected to the same respective output bit busses by control rectifiers 40, 42, 44, 46. Further, the input bit bus 26 is interconnected to the respective output bit busses 14, 16, 18, 20 by means of control rectifiers 50, 52, 54, 56 respectively.

The anodes of the controlled rectifiers 30, 40, and 50 are connected to a direct current source (zero volt potential in the preferred embodiment) at conductor 60 through a ballast impedance 62 and similarly, controlled rectifiers 32, 42, and 52 are connected to conductor 60 through impedance 64, controlled rectifiers 34, 44 and 54 through impedance 66 and controlled rectifiers 36, 46 and 56 through impedance 68. The horizontal line of controlled rectifiers 30, 32, 34, 36 are likewise connected to a zero volt potential at input terminal 70 through a ballast impedance 72, the second line of controlled rectifiers 40, 42, 44, 46 through a ballast impedance 74, and a third line of rectifiers 50, 52, 54 and 56 through a ballast impedance 76. Thus, with all of the controlled recifiers in a non-conductive state, the input busses 22, 24 and 26 and the output busses 14, 16, 18 and 20 are at a zero volt potential.

The condition being sensed is utilized to generate a digital information signal indicative of the presence or absence of the sensed condition, this signal being fed to the input terminal 80 connected in circuit with the gate electrode of each of the controlled rectifiers 30 – 56. This information signal at terminal 80 causes the selected controlled rectifier 30 – 56 to be enabled in the event that proper polarity signals are impressed on selected output busses 14 – 20. Thus, by selectively energizing one of the output bit busses 14 – 20 and sampling of the input bit busses 22 – 26, a particular condition may be sensed and this information stored in the data processor. For example, if the circuit connected to the gate electrode of controlled rectifier 46 is to be scanned, the data processor 12 energizes output bit 4 bus 20 and input bit 2 bus 24 is sampled. If the condition is such to generate the proper gate signal, the controlled rectifier 46 is rendered conductive and a positive voltage level is generated across impedance 74 and the voltage at input bus 24 rises.

In operation, the conductors connected to output bit busses 14, 16, 18, 20 are at a zero voltage level due to the fact that the input bit busses 14, 16, 18, 20 are deenergized and the controlled rectifiers are non-conductive. When it is desired to read a particular bit of information being fed to a specific controlled rectifier, the conductor connected to the anode electrode of the selected controlled rectifier is energized by setting a voltage on the output bit bus corresponding to the particular controlled rectifier selected.

For example, if controlled rectifier 30 is selected, the output bit 1 bus 14 is energized with a positive voltage. This positive voltage renders the conductor connected to the anode electrode of controlled rectifier 30 positive due to the voltage drop across impedance 62. If the controlled rectifier 30 is enabled by means of an input signal at the gate electrode through terminal 80, the horizontal conductor 86 also becomes positive due to the action of the ballast impedance 72 connected to the zero potential at terminal 70. This positive potential at conductor 86 may then be read by sensing the voltage level on input bit 1 bus 22 through conductor 88. The data processor 12 permits sufficient time for the above described setup, in the order of microseconds, before the positive voltage on conductor 86 is read through input bit 1 bus 22.

After the data processor 12 has read the signals on output conductor 88, the signal on output bus 14 is cancelled. This cancellation of the bus 14 signal turns off controlled rectifier 30 due to the lack of a positive voltage at the anode electrode thereof. The conductor 84 returns to zero volt potential which, in turn, returns the conductor 86 to a zero volt potential and the signal is removed from conductor 88. It is to be noted that the rectifying action of controlled rectifiers 30 – 56, in addition to the diodes connected to output busses 14 – 20 and input busses 22 – 26, precludes any feedback or circulating currents from forming within the matrix or being fed to an external circuit connected thereto.

Figure 2:
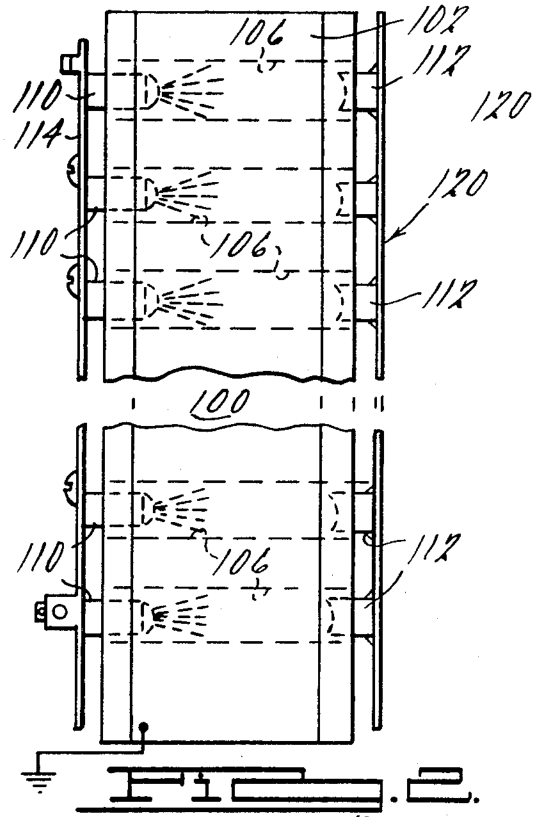
FIG. 2 is a side view of a preferred interface assembly incorporating certain features of the present invention.
Figure 3:
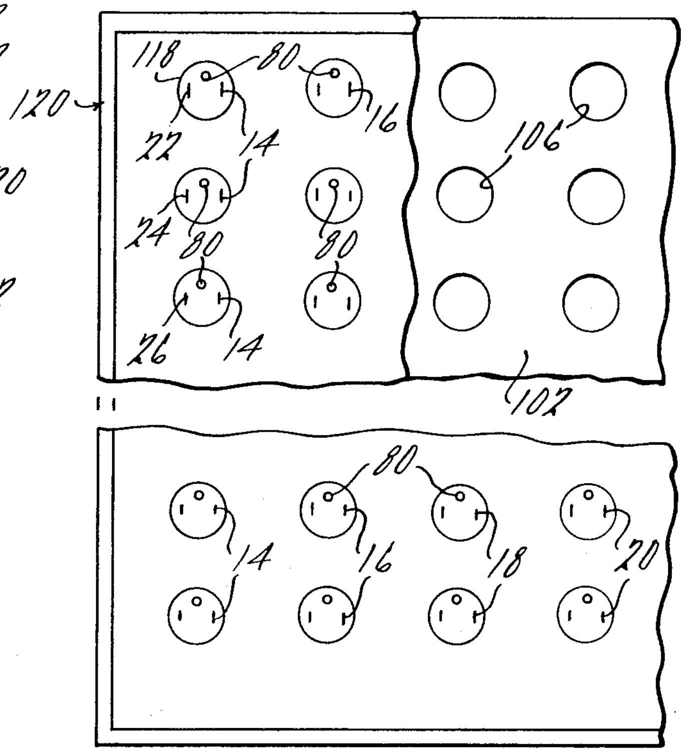
FIG. 3 is a view looking toward the right side of FIG. 2 and illustrating a terminal plug of the interface assembly.

FIGS. 2 and 3 illustrate a preferred assembly 100 for utilizing the features of the present invention, the assembly of FIGS. 2 and 3 being capable of being connected in the manner described in conjunction with the description of FIG. 1. Specifically, the assembly 100 is mainly fabricated of a transmission block 102, preferably formed from a solid piece of highly thermally and electrically conductive material, as for example aluminum. The block 100 is provided with a plurality of horizontally and vertically spaced apertures or tunnels 106 which may be drilled, cast or otherwise formed in the block 102. The apertures are utilized as transmission tubes for transmitting sound or light waves from a plurality of video or audio transmitter elements 110 to a corresponding number of receiver units 112.

The transmission units 110 are mounted on a terminal board 114, the units 110 having individual plugs integrally formed therewith or the plugs are mounted on the board at 114 and are electrically connected to the transmission units 110. Accordingly, the input information is fed by means of a conductor (not shown) connected to the input plug of the transmitter device 110, wherein the signal is translated from an electrical signal to a light or sound signal eminating from the right end of the transmitting device 110 seen in FIG. 2.

It will be noted that the transmitting device 110 is placed sufficiently within the tunnels 106 formed in the block 102 to preclude any extraneous light or sound from entering the end of the tunnel. The airborne signal travels across the space between transmitting device 110 and receiving device 112 and impinges on the end of receiver 112, the signal then being retranslated from an airborne to an electrical signal within the receiver 112. The transmitters 110 and receivers 112 may be any of the high quality devices presently commercially available which are insensitive to the noise signals encountered in systems of the type described.

The circuit described in conjunction with FIG. 1 is formed on a printed circuit board 120 which may also be utilized to mount the receiving devices 112. The receiver 112 is connected to the input to the gate circuit for the respective controlled rectifiers 30 – 56 described in conjunction with FIG. 1. Particularly, the signal from receiver 112 is connected through the input terminal 80 to cause the particular controlled rectifiers 30 – 56 to be rendered conductive if input signals have been provided at the proper output bit bus 14 – 20. For purposes of illustration, FIG. 3 has been provided with reference numerals corresponding to those described in conjunction with FIG. 1, the assembly of FIGS. 2 and 3 having been expanded in the vertical direction to include additional horizontal rows of output terminals. All of the controlled rectifiers, and other terminal elements, are either mounted on or integrated into the mounting board 120, these elements not being specifically illustrated in FIGS. 2 and 3.

The signal being fed to the transmitter outlet 110 could be of any voltage between 6 and 600 volts AC or DC. The transmitter 110 accepts the signal and transforms the electrical energy into a sharply defined light or sonic media which travels through the tunnels 106. Due to transformation from an electrical voltage to a light or sonic signal, a major portion of the high frequency electrical noise is eliminated from the signal being fed to the receiving devices 112 due to the inability of the noise signal to be translated to an airborne signal by the transmitters 110. A substantial portion of the remaining noise is absorbed through the tunneling effect of the light or sonic signal passing through the grounded block 102, this remaining noise also being high frequency and capable of being conducted to ground by the block 102.

The unit 112 is normally an "on" or "off" type device wherein a light or sonic signal being generated from the transmitter 110 switches the receiving device 112 from its off to its on state. Conversely, when the transmitter 110 ceases to generate the light or sonic signal, the receiving device 112 is switched back to its off state. It is the on or off condition which causes controlled rectifiers 30 – 56 to be rendered conductive or non-conductive, respectively, when proper voltages are fed to the output bit busses. The configuration illustrated in FIG. 3 is particularly adapted to fit the octal bit configuration of a data processor. It is to be understood that the reference numerals applied to the terminals are purely representative and arbitrary, and they may or may not illustrate the connection of busses 14 – 20 and 22 – 26 and input terminals 80 in any selected system.

In checking for circuit failures in the matrix system of FIG. 1, it is obvious that, if the transmitters of FIG. 2 are turned off, the control rectifiers 30 – 56 will be rendered non-conductive due to the lack of signal at the gate electrode. Accordingly, in order to determine if any control rectifier has failed, this failure normally occuring as a short circuit between the anode and cathode electrodes thereof, it is only necessary that the power to the output busses 14 – 20 of FIG. 1 be supplied and each of the input busses 22 – 26 be scanned for an output signal.

Accordingly, the output busses 14 – 20 are sequentially energized with the required signal level and polarity by the processor 12 and the input busses 22 – 26 scanned to determine if there is a signal present on these conductors. If, for example, output bus 16 is energized and input bus 24 is scanned, and an output signal is sensed at bus 24, it is obvious that the control rectifier 22 is defective in the short circuit state. Thus, each of the control rectifiers 30 – 56 may be easily and automatically checked to determine if this short circuit condition exists. Further, the opposite or open circuit condition may be similarly checked by energizing all of the receivers to provide gate signals at input terminals 80. In this situation, the input busses 22 – 26 may be checked for the presence of a signal level at input busses 22 – 26. If there is an absence of a signal at any particular input bus, the defective control rectifier circuit may be readily pinpointed.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, the control rectifiers described above are intended to include semiconductor switches and may be LASCR devices, light, heat and sound responsive devices generally, or voltage or current responsive devices which are controlled by other airborne signal responsive devices.

What is claimed is:

1. An interface system for transmitting data from an electrical source to a data processor and eliminating electrical noise therefrom including a plurality of input terminals and a plurality of output terminals, the improvement comprising means for reducing electrical and airborne noise signals from said data including tunnel means including a block of electrically conductive material, said block having a plurality of holes therein forming tunnels, said holes being positioned in said block in an array configuration having an X and Y axis, a plurality of transmitter means corresponding in number to the number of tunnels connected to the input terminals for translating said data signals to non-electrical airborne signals, receiver means corresponding in number to the number of tunnels connected to the output terminals for translating said airborne signals into the data signals, a transmitter plate having said plurality of transmitter means mounted thereon in an array corresponding to said block array, a receiver plate having said plurality of receiver means mounted thereon in an array corresponding to said block array, means mounting said transmitter plate on one side of said block with said transmitter means projecting into said holes, means mounting said receiver plate on the opposite side of said block with said receiver means projecting into said holes, and means grounding said block, said holes shielding the path between said transmitter and receiver means from external spurious signals.

2. The improvement of claim 1 further including means hingedly mounting said transmitter and said receiver plates relative to said block.

* * * * *